May 6, 1924.
A. P. LOMBARD
SILENCER FOR VALVE MECHANISM
Filed May 14, 1921
1,493,357
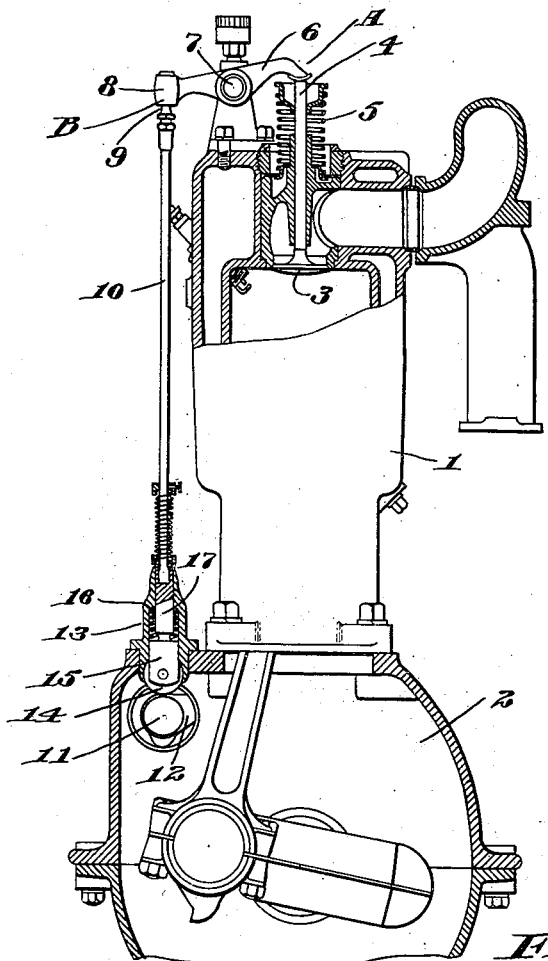
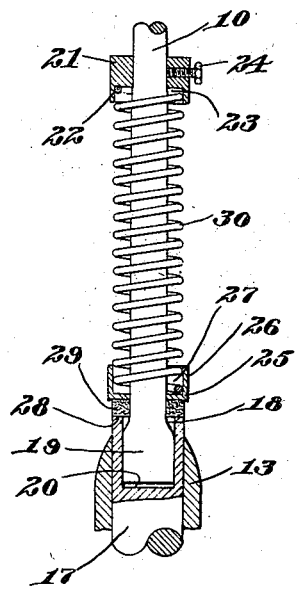
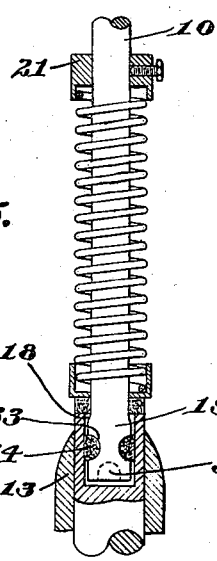
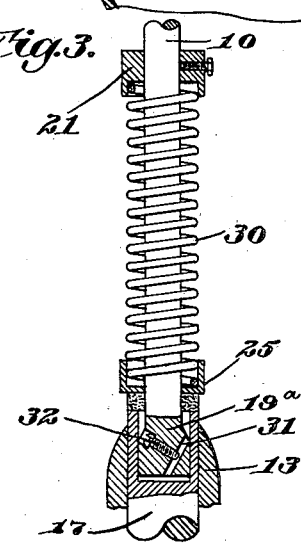
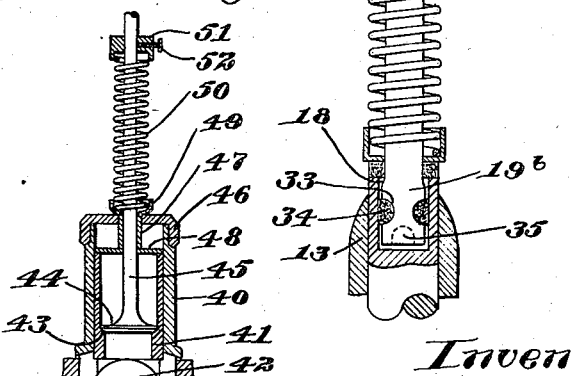
Inventor
Arthur P. Lombard
By Roberts, Roberts & Cushman
his Attorneys Patented May 6, 1924.

1,493,357

UNITED STATES PATENT OFFICE.

ARTHUR P. LOMBARD, OF SKOWHEGAN, MAINE.

SILENCER FOR VALVE MECHANISM.

Application filed May 14, 1921. Serial No. 469,523.

*To all whom it may concern:*

Be it known that I, ARTHUR P. LOMBARD, citizen of the United States of America, and resident of Skowhegan, in the county of Somerset and State of Maine, have invented new and useful Improvements in Silencers for Valve Mechanism, of which the following is a specification.

This invention relates to valve-actuating devices for internal combustion engines and more particularly to means whereby to lessen objectionable sounds emanating therefrom and due to lost motion between the various parts. In accordance with the usual practice, the valve in such engines is lifted at intervals by the action of a rotating cam, suitable connecting rods and levers being interposed between the cam and valve for this purpose. In order to insure the proper seating of the valve, as well as to provide for variations in length of the connecting parts due to temperature changes, it is common to provide for a slight degree of lost motion between certain of the connecting parts. In at least one well known type of engine, this lost motion is provided for by seating the end of the valve push-rod in a socket in the end of the cam actuated tappet, the rod end being slidable within the socket and thus furnishing the desired amount of lost motion. In connection with the operation of the so-called "over-head" type of valve, and where a lever is usually interposed between the valve stem and pusher-rod, an indeterminate amount of lost motion may also exist due to wear or inaccurate adjustment of the parts.

In whatever manner the lost motion occurs, the result is to produce a slight noise or click at that instant in the operation of the parts at which the lost motion is taken up and the parts come into positive driving contact. Not only is this noise objectionable to the user of the engine, but the repeated blows to which the cooperating parts are thus subjected results in rapid wear thereof, necessitating frequent replacement. The principal object of the present invention is to provide for the substantial elimination of such objectionable noise in the valve operating connections, as well as to reduce the shock and consequent rapid wear of the parts.

As one mode of attaining the desired results, it is proposed, in accordance with the present invention, to provide an attachment applicable to valve actuating devices of ordinary form and which may be applied thereto without substantial change or modification therein. When, as above referred to, the lost motion is provided between the rod and tappet, the attachment may comprise a collar adapted to be secured to the rod and serving as an abutment for one end of a coil spring, the other end of such spring bearing against the end of the tappet, and thus tending to force the rod and tappet apart. A spring thus arranged, not only serves to cushion the blow as the tappet moves toward the rod, but also tends to maintain the tappet roll in contact with its cam, as well as to take up lost motion between the members connecting the rod and valve, if such connections be employed. For further cushioning the blow as the rod and tappet contact, the rod may be formed as a plunger or piston working in a socket in the tappet, the parts thus acting in the manner of a dash-pot wherein air, oil or other fluid might be utilized as the cushioning agent.

A preferred form of appliance constituting an embodiment of the present invention is illustrated in the accompanying drawings in which:—

Fig. 1 is an end elevation, partly in section, of an internal combustion engine of well-known type showing the present invention as applied thereto;

Fig. 2 is a fragmentary cross section to large scale illustrating the lower end of the valve push-rod with the present invention applied thereto;

Fig. 3 is a view similar to Fig. 2, but illustrating a slight modification of the parts therein shown;

Fig. 4 is a view similar to Fig. 2 and illustrating a further modification; and

Fig. 5 is a view similar to Fig. 2, but to smaller scale, illustrating the invention as applied to a somewhat different type of valve actuating mechanism.

Referring to Figs. 1 to 4, inclusive, the engine cylinder is indicated at 1 and the crank case at 2. A valve of the overhead type is shown at 3, such valve having a stem 4 and being provided with a spring 5 which normally serves to bring the valve to its seat. Engaging the upper end of the valve stem is one arm 6 of a rocker device pivoted at 7, and whose other arm, at 8, is provided with a socket with which engages the upper end 9 of the push-rod 10. At 11 is indicated the usual cam shaft having thereon a cam such as 12, such cam contacting with a roll 14 carried by a valve lifter or tappet 15. This tappet or valve lifter is provided with a substantially cylindrical portion 17 which is slidable within the valve guide device 13 carried by or forming an integral portion of the crank case. Interposed between a shoulder in the guide 13 and the lower part of the valve lifter is a spring 16 which normally tends to hold the roll 14 in contact with the cam 12.

The parts heretofore described are substantially such as are commonly employed, but in such arrangements it is necessary to provide for a slight amount of lost motion between the tappet 15 and the valve 3 in order to assure the proper seating of the valve under all conditions. Such lost motion is in some instances, and as herein illustrated, provided by forming the upper end of the member 17 with an axial cylindrical socket 18 (Fig. 2) with which slidably engages the lower end of the push-rod 10. Such lower end may, if desired, be of somewhat greater diameter than the main body of the rod, forming a piston head slidable within the socket 18. In order to secure the necessary lost motion between the parts, the lower end of the piston 19 normally stands above the bottom of the socket 18 a slight distance and such as experience has shown to be desirable. This space is herein indicated at 20, and is very much exaggerated in the illustration but is commonly of the order of .002 of an inch. The presence of this space, as well as the fact that the valve rod 4 merely contacts at point A with the rocker arm 6, while the upper end of the push-rod 10 has a socket connection at B with the end 8 of the rocker, is a frequent source of noise or clicking in the operation of valves of this type due to the fact that as the tappet rises, the various parts come into positive contact, with consequent vibration and noise.

In accordance with the present invention, a collar 21 is provided, such collar preferably being provided at one side with an outstanding annular flange 22, thus forming a cup-like cavity 23. This collar has an opening for the reception of the push-rod 10, and may be secured thereon in adjusted position by means of a set screw 24 or in any other desired manner. A second collar 25 is also employed, such collar having an outstanding flange 26 forming the cup-like cavity 27. The collar 25 may, if desired, rest directly upon the upper end 28 of the portion 17 of the tappet, but preferably there is interposed between the collar 25 and the end 28 a washer 29 of resilient material, such washer preferably being of felt or some similar material capable of absorbing oil or other lubricant. Interposed between the collars 21 and 25, and having its opposite ends seated within the respective cavities 23 and 26, is a coil spring 30 which encircles the push-rod 10. This spring, as thus arranged and when properly compressed by adjustment of the collar 21, has a tendency to move the tappet 17 and the push-rod 10 in opposite directions. This spring thus assures contact of the cam roll with the cam while, at the same time, it serves to take up lost motion at the points A and B, and also to provide a space at the point 20 between the plunger 19 and the bottom of the socket 18. Thus lost motion is eliminated, except at the point 20, and as the tappet rises by the action of the cam, the spring 30 is further compressed, thus ensuring the gradual taking up of the lost motion at the point 20 and cushioning the contact of the piston 19 with the bottom of the socket 18. Such cushioning is further enhanced by the dash-pot action of the piston 19 in compressing the air within the socket, such air necessarily leaking by the piston before the piston can contact with the bottom wall of the socket. With this arrangement the clicking noise commonly observed in connection with valve mechanism of this type is substantially eliminated, the valve working quietly and in a highly satisfactory manner. It is evident that the device herein disclosed can be applied to valve mechanisms without any substantial change therein and thus the appliance may be sold and applied to existing valve mechanisms without the necessity of employing a skilled mechanic or the use of machine tools.

In the device illustrated in Fig. 3, the parts are substantially like those previously described with the exception that the piston 19<sup>a</sup> is provided with an opening or passage-way 31 extending from its lower face to its upper face, such opening serving for the escape of air compressed beneath the piston during the upstroke of the tappet 17. For controlling the escape of air through such passage, an adjusting screw 32 is provided, such screw having threaded engagement with an opening intersecting the passage 31, thus permitting the end of the screw to be adjusted whereby to obstruct such passage more or less as occasion may demand.

In the device illustrated in Fig. 4, the parts are substantially like those previously described with the exception that the piston head 19<sup>b</sup> is provided with a circumferential groove 33 within which is arranged a packing ring 34. In this case, the piston head may be of somewhat smaller diameter than the socket 18 within which it slides, the packing ring serving to form a close joint between the piston and the walls of the socket. If desired the lower end of the piston may have an axial chamber 35, therein serving to enlarge the air containing capacity of the chamber below the piston head.

In Fig. 5 is illustrated a modification of the valve mechanism shown in Fig. 1, the valve lifter provided being indicated at 40 and the tappet or valve lifter comprising a sleeve 41 slidable within the guide 40. The sleeve 41 has secured to its lower end a cam engaging roller 42 and at a point above said roller is furnished with an annular interior shoulder 43. This shoulder serves to engage the enlarged head 44 of the lifter rod 45, such rod corresponding to the rod 10 previously described. The upper end of the guide 40 may be closed by a cap 46 having a central opening therein for the passage rod 45. This opening, in accordance with the present invention, is somewhat enlarged for the reception of a sleeve member 47, the lower end of which rests upon a washer 48 supported upon the upper end of the sleeve-like tappet 41. The upper end of the sleeve 47 is flanged outwardly as at 49 to provide a cup-like socket in which is seated the lower end of the spring 50 encircling the rod 45. The upper end of the spring 50 engages a collar 51 which may be substantially like the collar 21 previously described and adjustably fixed upon the rod 45 by means of a set screw 52.

With the parts as just described, the spring 50 acting through the sleeve 47 and washer 48 tends to push the tappet 41 downwardly, thereby holding the roller 42 in contact with its actuating cam. At the same time the spring tends to lift the rod 45, thus taking up lost motion at points such as A, B, previously referred to, and lifting head 44 from the shoulder 43. When the tappet 41 is lifted, the spring is further compressed until the shoulder 43 comes into contact with the head 44, such contact being cushioned, due to the presence of the spring 50.

It is thus evident that with all of the arrangements described, the actuation of the valve is due to the positive contact of the tappet with the end of the push-rod, but that the blow of such contact is cushioned by the interposed spring and furthermore that such spring serves to take up lost motion at all other points in the connections. The absorbent washer 29 may be charged with oil or other lubricant for the reciprocatory push-rod, and when so charged serves also as an air tight cover for the cavity 18, thus adding to the dash pot effect of the piston therein.

While as herein disclosed, the appliance has been shown as employed with a valve mechanism of the over-head type, it is clear that it might also be applied to valves of other forms, the principle of operation being readily applicable in any case where it is necessary to have lost motion between the operating parts while at the same time providing for the positive actuation of the same.

I claim:

1. A valve actuating mechanism comprising a tappet having a substantially cylindrical socket therein, a push rod having a piston-like extremity slidably engaging said socket, said piston-like extremity being provided with a packing ring, a collar surrounding the rod and movable with the tappet, a spring bearing at one end against said collar and a second collar adjustably secured to the rod and forming an abutment for the other end of the spring.

2. A valve actuating mechanism comprising a tappet having a substantially cylindrical socket therein, a push-rod having a piston-like extremity slidably engaging said socket, an oil absorbent washer encircling said rod and resting against the outer end of the tappet, a collar seated upon said washer and encircling the rod, a coil spring through which the rod extends and having one end bearing against said collar, and a second collar adjustable longitudinally of the rod and forming an abutment for the other end of the spring.

3. A valve actuating mechanism comprising a tappet having a substantially cylindrical socket therein, a push rod having a piston-like extremity slidably engaging said socket, said piston-like extremity having a circumferential groove therein, a resilient packing ring seated within said groove, an oil absorbent washer encircling said rod and resting against the outer end of the tappet, a collar seated upon said washer and encircling said rod, a coil spring through which the rod extends and having one end bearing against said collar, and a second collar adjustable longitudinally of the rod and forming an abutment for the other end of the spring.

4. A valve actuating mechanism comprising a tappet having a substantially cylindrical socket therein, a push rod having a piston like extremity slidably engaging said socket, a collar adjustable longitudinally of the rod, a coil spring encircling the rod and abutting at one end against the collar, and an oil absorbent washer interposed between the tappet and the other end of the spring.

Signed by me at Boston, Massachusetts, this twelfth day of May, 1921.

ARTHUR P. LOMBARD.